Patented Feb. 15, 1949

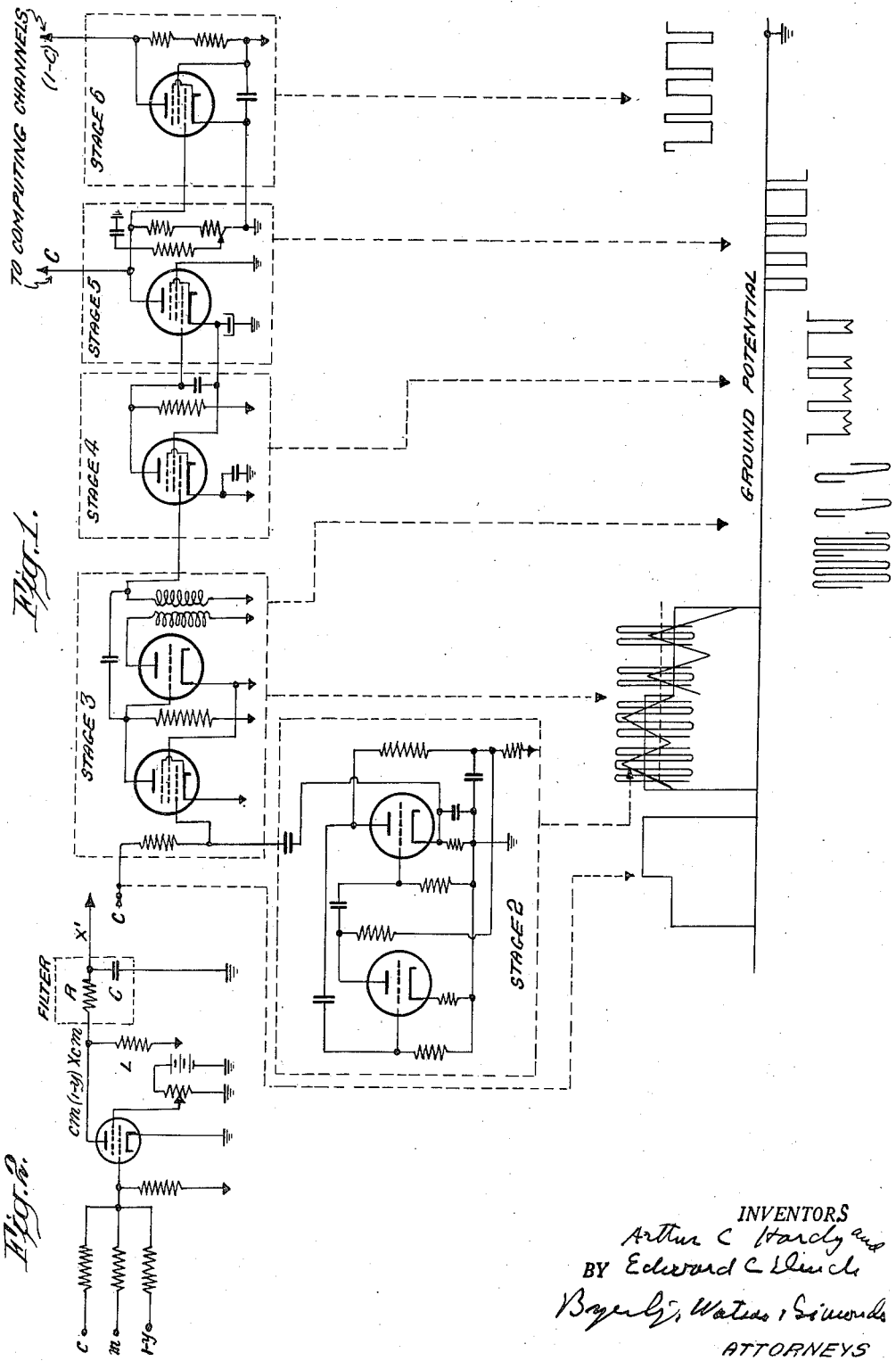

2,461,895

UNITED STATES PATENT OFFICE 2,461,895

MULTIPLYING APPARATUS

Arthur C. Hardy, Wellesley, Mass., and Edward C. Dench, West Hartford, Conn., assignors to Interchemical Corporation, New York, N. Y., a corporation of Ohio Original application July 8, 1944, Serial No. 543,990. Divided and this application December 3, 1946, Serial No. 713,658

10 Claims. (Cl. 235—61)

This invention relates to multiplying apparatus.

This application is a division of our application Serial No. 543,990, filed July 8, 1944.

The multiplication is effected on the basis of the probability principle that, if an event $a$ happens $a\%$ of the time and an event $b$ happens $b\%$ of the time, then the proportion of the time when both events occur is the product of $a\%$. $b\%$. To utilize this principle, a series of rectangular waves (or "square waves" as they are commonly termed) is generated for each factor to be multiplied. In each series, the length of the pulses is so related to the length of the spaces between the pulses that the length of a pulse divided by the length of a cycle (that is, the effective length of the pulse) is equal to the factor. In order to approach a random distribution which would result in perfectly accurate multiplication, the frequencies of the waves for each factor must be irrationally related. The frequencies should be so selected that, when the signals are combined, all beats are of sufficiently high frequency to be filtered out or are of small amplitude compared with the amplitude of the waves representing the factors. The multiplication is effected by leading the series of square waves representing the factors to be multiplied to a collector which indicates the percentage of the time during which pulses occur simultaneously in all the series.

In carrying out the invention, each of a number of signals representing factors to be multiplied is led to a square-wave generator. The generators produce series of square waves of different frequencies. Each generator is so controlled by the signal which it receives that the ratio between the pulse length and the cycle length in the series of square waves which it generates is equal to the received signal. The outputs of the generators are, therefore, series of square waves representing the factors to be multiplied.

The series of square waves corresponding to the factors are led to a collector which produces a signal which is equal to the proportion of the time in which pulses occur simultaneously in all of the series and, therefore, proportional to the product of the factors.

The details of the electrical apparatus forming the multiplier which has been described may be greatly varied within the scope of our invention, but, for the sake of illustration, we will describe the particular apparatus and circuits which we have found most satisfactory. In this description, we will refer to the accompanying drawings in which:

Fig. 1 is a circuit diagram of an illustrative square-wave generator; and

Fig. 2 is a circuit diagram of an illustrative collector.

For the sake of illustration, we will describe apparatus for computing the product $$cm (1-y) X_{cm}$$

in which $c$, $m$, and $(1-y)$ are factors which may be variables and $X_{cm}$ is a constant coefficient.

Electric signals, for example voltages, corresponding to each of the quantities $c$, $m$ and $y$ are led to square-wave generators of the type shown in Fig. 1. The upper part of this figure is a circuit diagram and the lower part of the figure shows the form of the waves and the potential to ground at different stages of the circuit.

Stage 2 is a conventional triangular-wave generator and stage 3 is an oscillator trigger circuit which, when triggered, generates a wave of much higher frequency than that of the triangular wave generated in stage 2.

The triangular wave voltage from stage 2 and the signal voltage $c$ from stage 1 are added and applied to the trigger circuit of stage 3. When the sum of the triangular wave voltage and the signal voltage exceeds the critical trigger voltage, the oscillator of stage 3 is triggered and continues to oscillate until the signal voltage plus the triangular wave voltage falls below this critical trigger value. The per cent of time that the oscillator is on is proportional to the signal voltage. As a result, the oscillator produces groups of short waves separated by spaces as indicated in the diagram below stages 2 and 3 of the circuit. The frequency of the groups of short waves is the frequency of the triangular wave generated in stage 2, while the ratio of the length of each group of waves to the length of the cycle, which, for convenience, we term the "effective length" of the group, is equal to the signal voltage $c$.

The groups of oscillations from stage 3 are fed into stage 4 which is a detector which converts them into pulses of D. C. constituting a conventional square wave. These square-wave pulses are sent to a power amplifier which is stage 5 of the circuit. When the output of stage 4 is applied to the grid of the power amplifier of stage 5, the residual ripple occurs below the cut-off grid voltage and hence does not appear in the output of stage 5 (see wave form shown below stages 4 and 5).

The output of stage 5 is a train of square waves in which the effective length of the positive impulses corresponds to the signal which is fed to stage 2. This output may also be fed to an inverter forming stage 6 of the circuit. The output of the inverter is a train of square waves in which the effective length of the positive impulses corresponds to one minus the signal which is fed to stage 2.

The arrows along the bottoms of the different stages of the circuits shown in Fig. 1 indicate connections to D. C. potentials. The biases to be used are indicated by the diagram at the bottom of Fig. 1 which shows the voltage relation between each stage and ground.

Fig. 2 shows a square-wave collector. It receives trains of square waves representing the values $c$, $m$ and $(1-y)$. The square wave signals representing $c$ and $m$ may be taken from stage 5 of the square-wave generators like that shown in Fig. 1, to which voltages representing the values $c$ and $m$ are fed. The square-wave signal representing the value $(1-y)$ may be taken from stage 6 of a square-wave generator like that shown in Fig. 1, to which a voltage representing the value $y$ is fed.

At the left-hand side of Fig. 2 are shown leads from the square-wave generators and inverters producing square-wave signals representing the values $c$, $m$, $(1-y)$. These three leads are connected together and to the control grid of a multi-grid tube to produce a negative bias such that it cuts off the flow of plate current except when positive voltage pulses occur in all three connected leads simultaneously. Whenever this happens, the bias becomes sufficiently positive to permit the flow of plate current in the multi-grid tube. The amplitude of the current pulses thus produced in the plate current of the multi-grid tube is controlled by the bias of the screen grid of the tube which is set by means of a potentiometer so that the amplitude of the plate current is proportional to the constant $X_{cm}$. The average plate current represents the product of the amplitude of the current pulses and the fraction of the time when such pulses exist. It is, therefore, proportional to the product $$cm\ (1-y)\ X_{cm}$$

To obtain a signal proportional to the average plate current, the plate of the tube is connected to an R-C filter whose time constant is large enough to filter out the frequencies of the trains of square waves and beat frequencies so as to produce a D. C. voltage proportional to the average plate current. The time constant of the filter is, however, small enough to allow changes rapid enough to give adequate resolution at the speed of calculating used.

The plate current of the tube is passed through a load resistor L connected to the filter. The signal output voltage of the filter will, therefore, be proportional to the average plate current and will, therefore, be the required product.

What is claimed is:

1. Computing apparatus for obtaining the product of a number of factors, comprising means for generating a number of series of rectangular waves at irrationally related frequencies and making the effective lengths of the impulses in each series correspond to one of the factors to be multiplied, and means for measuring the percentage of time during which impulses occur simultaneously in all said series.

2. Computing apparatus for obtaining the product of a number of factors, comprising means for generating a number of series of rectangular waves at different frequencies and making the effective lengths of the impulses of each series correspond to one of the factors to be multiplied, leading said series to a common collector to measure the percentage of time during which impulses occur simultaneously in all said series, and filtering out high-frequency beats.

3. Computing apparatus for obtaining the product of a number of factors, comprising means for generating a number of series of rectangular waves at different frequencies and making the effective lengths of the impulses in each series correspond to one of the factors to be multiplied, leading said series to a common collector which responds when impulses occur simultaneously in all said series, and filtering the output of the collector.

4. Electrical means for computing the product of a number of factors, comprising a three-element electronic tube, a low-pass filter connected in the plate circuit of the tube, means for biasing the grid of the tube sufficiently to cut off the flow of plate current, means for generating a number of series of rectangular voltage waves of different frequencies in each of which series the effective length of the positive impulses represents one of the factors to be multiplied, means for feeding said series of voltage waves to the grid of the tube, the intensity of the voltage impulses in the series being sufficient to counterbalance the cut-off bias and to permit the flow of plate current when impulses occur simultaneously in all the series and insufficient to counterbalance the cut-off bias when impulses occur in less than all the series.

5. Electrical means for computing the product of a number of variable factors and a fixed factor, comprising an electronic tube having two grid elements, means for biasing one of the grids of the tube sufficiently to cut off the flow of plate current, means for generating a number of series of rectangular voltage waves of different frequencies in each of which series the effective length of the positive impulses represents one of the variable factors to be multiplied, means for feeding said series of voltage waves to the grid bias in opposition thereto, the intensity of the voltage impulses in the series being sufficient to counterbalance the cut-off bias and permit the flow of plate current only when impulses occur simultaneously in all the series, and means for regulating the voltage of the other grid in proportion to the fixed factor so that the average plate current is proportional to the product of the variable and fixed factors.

6. Computing apparatus for obtaining the product of a number of factors, comprising generators for producing a number of series of rectangular waves of different frequencies and making the effective length of impulses of the same polarity in each series correspond to one of the factors to be multiplied, and a common collector connected to the generators to measure the percentage of time during which such impulses occur simultaneously in all the series.

7. Computing apparatus for obtaining the product of a number of factors, comprising generators for producing a number of series of rectangular waves of different frequencies and making the effective length of impulses of the same polarity in each series correspond to one of the factors to be multiplied, a common collector connected to the generators and adapted to respond when such impulses occur simultaneously in all said series, and means for measuring the average response of the collector.

8. Electrical means for computing the product of a number of factors, comprising an electronic tube having a control grid, generators for producing a number of series of rectangular voltage waves of different frequencies in each of which series the effective length of the positive impulses represents one of the factors to be multiplied, circuits for feeding all said series of voltage waves to the control grid of the tube, the voltage level of the impulses in the several series being such as to produce on the grid a voltage which permits the flow of plate current when positive impulses occur simultaneously in all the series and to produce on the grid a cut-off bias when positive impulses occur in less than all the series.

9. Electrical means for computing the product of a number of variable factors and a fixed factor, comprising an electronic tube having two grid elements, generators for producing a number of series of rectangular voltage waves of different frequencies in each of which series the effective length of the positive impulses represents one of the variable factors to be multiplied, conductors connecting each generator with one of the grids of the tube, the voltage levels of the impulses of the wave series being such as to bias the grid below cut-off except when positive impulses occur simultaneously in all the series, and means for applying a voltage proportional to the fixed factor to the other grid of the tube, so that the average plate voltage of the tube is proportional to the product of the variable and fixed factors.

10. Electrical means for computing the product of a number of factors, comprising an electronic tube having a control grid, generators for producing a number of series of rectangular voltage waves of different frequencies in each of which series the effective length of the positive impulses is proportional to one of the factors to be multiplied, a circuit connecting said generators to provide a control voltage equal to a fixed proportion of the sum of the voltage in said series and to apply said control voltage to the grid of the tube, the operation of the tube being such that current flows in its plate circuit when the voltage applied to its grid is more positive than a value equal to said fixed proportion of the sum of the positive impulses in one less than all said series.

ARTHUR C. HARDY.
EDWARD C. DENCH.

REFERENCES CITED

The following references are of record in the file of this patent:

UNITED STATES PATENTS

| Number | Name | Date |
|---|---|---|
| 2,381,826 | Levy-Savoye | Aug. 7, 1945 |
| 2,401,779 | Swartzel | June 11, 1946 |